(12) United States Patent
Gunn et al.

(10) Patent No.: US 7,751,947 B2
(45) Date of Patent: Jul. 6, 2010

(54) METHODS AND SYSTEMS FOR DISPLAYING ASSISTANCE MESSAGES TO AIRCRAFT OPERATORS

(75) Inventors: Peter D. Gunn, Bellevue, WA (US); John C. Griffin, III, University Place, WA (US)

(73) Assignee: The Boeing Company, Chicago, IL (US)

( * ) Notice: Subject to any disclaimer, the term of this patent is extended or adjusted under 35 U.S.C. 154(b) by 1402 days.

(21) Appl. No.: 10/814,494

(22) Filed: Mar. 31, 2004

(65) Prior Publication Data

US 2005/0228674 A1 Oct. 13, 2005

(51) Int. Cl.
- G01C 23/00 (2006.01)
- G01C 5/00 (2006.01)
- G05D 1/06 (2006.01)

(52) U.S. Cl. .................. 701/3; 701/1; 701/8; 701/9; 701/11; 701/14

(58) Field of Classification Search ........................ None
See application file for complete search history.

(56) References Cited

U.S. PATENT DOCUMENTS

| | | | |
|---|---|---|---|
| 3,191,147 A | 6/1965 | Majendie | |
| 3,696,671 A | 10/1972 | Steigleder et al. | |
| 3,967,098 A | 6/1976 | Harnagel et al. | |
| 4,147,056 A | 4/1979 | Muller | |
| 4,196,474 A | 4/1980 | Buchanan et al. | |
| 4,212,064 A | 7/1980 | Forsythe | |
| 4,224,669 A * | 9/1980 | Brame | 701/8 |
| 4,247,843 A | 1/1981 | Miller | |
| 4,274,096 A | 6/1981 | Dennnison | |
| 4,325,123 A | 4/1982 | Graham | |
| 4,471,439 A | 9/1984 | Robbins et al. | |
| H139 H | 10/1986 | Task | |
| 4,631,678 A | 12/1986 | Angermuller et al. | |
| 4,642,775 A | 2/1987 | Cline et al. | |
| 4,729,102 A | 3/1988 | Miller, Jr. et al. | |
| 4,746,981 A | 5/1988 | Nadan et al. | |
| 4,792,906 A | 12/1988 | King | |

(Continued)

FOREIGN PATENT DOCUMENTS

DE 3315386 A 10/1984

(Continued)

OTHER PUBLICATIONS

U.S. Appl. No. 10/798,588, Griffin, III et al.

(Continued)

*Primary Examiner*—Khoi Tran
*Assistant Examiner*—Bhavesh V Amin
(74) *Attorney, Agent, or Firm*—Perkins Coie LLP

(57) ABSTRACT

Methods and systems for displaying assistance messages to aircraft operators are disclosed. A method in accordance with one embodiment includes receiving an input from an aircraft operator at an aircraft flight deck, comparing a characteristic of the input to at least one target value for the characteristic, and, if the characteristic of the input differs from the at least one target value for the characteristic by at least a threshold amount, displaying an assistance message to the aircraft operator. The assistance message can include a complying input and/or an instruction for creating a complying input. The input and the assistance message can be displayed simultaneously.

48 Claims, 7 Drawing Sheets

U.S. PATENT DOCUMENTS

| | | |
|---|---|---|
| 4,845,495 A | 7/1989 | Bollard et al. |
| 4,860,007 A | 8/1989 | Konicke |
| 4,939,661 A | 7/1990 | Barker et al. |
| 5,050,081 A | 9/1991 | Abbott |
| 5,070,458 A | 12/1991 | Gilmore et al. |
| 5,072,218 A | 12/1991 | Spero et al. |
| 5,243,339 A | 9/1993 | Graham et al. |
| 5,283,643 A | 2/1994 | Fujimoto |
| 5,289,185 A | 2/1994 | Ramier et al. |
| 5,329,277 A | 7/1994 | Dougan et al. |
| 5,337,982 A | 8/1994 | Sherry |
| 5,416,705 A * | 5/1995 | Barnett ................. 701/14 |
| 5,420,582 A | 5/1995 | Kubbat |
| 5,454,074 A | 9/1995 | Hartel |
| 5,475,594 A * | 12/1995 | Oder et al. ................. 701/14 |
| 5,499,025 A * | 3/1996 | Middleton et al. .......... 340/959 |
| 5,519,392 A | 5/1996 | Oder et al. |
| 5,523,949 A | 6/1996 | Agate et al. |
| 5,592,198 A | 1/1997 | Fagard et al. |
| 5,629,691 A | 5/1997 | Jain |
| 5,668,542 A | 9/1997 | Wright |
| 5,715,163 A | 2/1998 | Bang |
| 5,736,955 A | 4/1998 | Roif |
| 5,739,769 A | 4/1998 | Vladimir |
| 5,745,054 A | 4/1998 | Wilkens |
| 5,802,492 A | 9/1998 | DeLorme et al. |
| 5,825,306 A | 10/1998 | Hiyokawa et al. |
| 5,844,503 A | 12/1998 | Riley et al. |
| 5,875,998 A | 3/1999 | Gleine |
| 5,884,219 A | 3/1999 | Curtwright et al. |
| 5,916,297 A | 6/1999 | Griffin, III et al. |
| 5,940,013 A | 8/1999 | Vladimir et al. |
| 5,941,930 A | 8/1999 | Morimoto et al. |
| 5,971,318 A | 10/1999 | Lustre |
| 5,978,715 A | 11/1999 | Briffe |
| 5,983,158 A | 11/1999 | Suzuki et al. |
| 5,995,290 A | 11/1999 | Noble |
| 5,995,901 A | 11/1999 | Owen et al. |
| 6,038,498 A | 3/2000 | Briffe et al. |
| 6,057,786 A | 5/2000 | Briffe |
| 6,067,502 A | 5/2000 | Hayashida et al. |
| 6,072,473 A | 6/2000 | Muller et al. |
| 6,075,467 A | 6/2000 | Ninagawa et al. |
| 6,085,129 A | 7/2000 | Schardt |
| 6,098,014 A | 8/2000 | Kranz |
| 6,112,141 A | 8/2000 | Briffe |
| 6,118,385 A | 9/2000 | Leard |
| 6,121,899 A | 9/2000 | Theriault |
| 6,128,553 A | 10/2000 | Gordon et al. |
| 6,154,151 A | 11/2000 | McElreath et al. |
| 6,161,062 A | 12/2000 | Sicre et al. |
| 6,175,315 B1 | 1/2001 | Millard et al. |
| 6,181,987 B1 | 1/2001 | Deker et al. |
| 6,188,937 B1 | 2/2001 | Sherry |
| 6,199,015 B1 | 3/2001 | Curtwright et al. |
| 6,246,320 B1 | 6/2001 | Monroe |
| 6,246,342 B1 | 6/2001 | Vandevoorde et al. |
| 6,262,720 B1 | 7/2001 | Jeffrey |
| 6,275,172 B1 | 8/2001 | Curtis et al. |
| 6,278,913 B1 | 8/2001 | Jiang |
| 6,289,277 B1 | 9/2001 | Feyereisen et al. |
| 6,313,759 B1 | 11/2001 | Musland-Sipper |
| 6,314,343 B1 | 11/2001 | Adams et al. |
| 6,314,363 B1 | 11/2001 | Pilley et al. |
| 6,314,366 B1 | 11/2001 | Farmakis et al. |
| 6,314,370 B1 | 11/2001 | Curtright |
| 6,335,694 B1 | 1/2002 | Beksa et al. |
| 6,346,892 B1 | 2/2002 | DeMers et al. |
| 6,362,750 B1 | 3/2002 | Castor |
| 6,381,519 B1 | 4/2002 | Snyder |
| 6,381,538 B1 | 4/2002 | Robinson et al. |
| 6,389,333 B1 | 5/2002 | Hansman |
| 6,405,975 B1 | 6/2002 | Sankrithi et al. |
| 6,424,909 B2 | 7/2002 | Kusano et al. |
| 6,443,399 B1 | 9/2002 | Yount et al. |
| 6,449,556 B1 | 9/2002 | Pauly |
| 6,453,236 B1 | 9/2002 | Aoki |
| 6,462,697 B1 | 10/2002 | Klamer et al. |
| 6,466,235 B1 | 10/2002 | Smith et al. |
| 6,470,224 B1 | 10/2002 | Drake |
| 6,473,675 B2 | 10/2002 | Sample |
| 6,512,527 B1 | 1/2003 | Barber et al. |
| 6,522,958 B1 | 2/2003 | Dwyer et al. |
| 6,542,796 B1 | 4/2003 | Gibbs et al. |
| 6,556,902 B2 | 4/2003 | Ing |
| 6,571,166 B1 | 5/2003 | Johnson et al. |
| 6,606,563 B2 | 8/2003 | Corcoran, III |
| 6,614,419 B1 | 9/2003 | May |
| 6,633,810 B1 | 10/2003 | Qureshi et al. |
| 6,636,786 B2 | 10/2003 | Partel |
| 6,668,215 B2 | 12/2003 | Lafon et al. |
| 6,690,299 B1 | 2/2004 | Suiter |
| 6,693,559 B1 | 2/2004 | Gyde et al. |
| 6,694,249 B1 | 2/2004 | Anderson et al. |
| 6,696,980 B1 | 2/2004 | Langner et al. |
| 6,697,718 B2 | 2/2004 | Le Draoullec et al. |
| 6,707,387 B2 | 3/2004 | Noguchi et al. |
| 6,707,475 B1 | 3/2004 | Snyder |
| 6,711,475 B2 | 3/2004 | Murphy |
| 6,720,891 B2 | 4/2004 | Chen et al. |
| 6,721,640 B2 | 4/2004 | Glenn |
| 6,735,505 B2 | 5/2004 | Levine |
| 6,745,113 B2 | 6/2004 | Griffin, III et al. |
| 6,751,545 B2 | 6/2004 | Walter |
| 6,753,891 B1 | 6/2004 | Chohan et al. |
| 6,784,869 B1 | 8/2004 | Clark et al. |
| 6,789,010 B2 | 9/2004 | Walter |
| 6,812,858 B2 | 11/2004 | Griffin, III |
| 6,842,672 B1 | 1/2005 | Straub et al. |
| 6,856,864 B1 | 2/2005 | Gibbs et al. |
| 6,870,490 B2 | 3/2005 | Sherry et al. |
| 6,871,124 B1 | 3/2005 | McElreath |
| 6,898,492 B2 | 5/2005 | De Leon |
| 6,909,967 B2 | 6/2005 | Hirano et al. |
| 6,915,190 B2 | 7/2005 | Galasso et al. |
| 6,927,782 B2 | 8/2005 | Coldefy et al. |
| 6,934,608 B2 | 8/2005 | Qureshi |
| 6,946,976 B1 | 9/2005 | Langner et al. |
| 6,957,130 B1 | 10/2005 | Horvath et al. |
| 6,980,198 B1 | 12/2005 | Gyde et al. |
| 6,992,596 B2 | 1/2006 | Cole et al. |
| 7,030,892 B1 | 4/2006 | Gyde et al. |
| 7,039,509 B2 | 5/2006 | Podowski |
| 7,072,746 B1 | 7/2006 | Burch |
| 7,093,070 B2 | 8/2006 | Rowlan |
| 7,142,131 B2 | 11/2006 | Sikora |
| 7,181,478 B1 | 2/2007 | Korson et al. |
| 7,188,007 B2 | 3/2007 | Boorman et al. |
| 7,222,017 B2 | 5/2007 | Clark et al. |
| 7,230,632 B2 | 6/2007 | Coldefy et al. |
| 7,321,318 B2 | 1/2008 | Crane et al. |
| 7,345,693 B2 | 3/2008 | Coldefy et al. |
| 7,363,119 B2 | 4/2008 | Griffin, III et al. |
| 2002/0004695 A1 | 1/2002 | Glenn et al. |
| 2002/0016654 A1 | 2/2002 | Ing et al. |
| 2002/0033837 A1 | 3/2002 | Munro |
| 2002/0099528 A1 | 7/2002 | Hett |
| 2003/0009278 A1 | 1/2003 | Mallet et al. |
| 2003/0025719 A1 | 2/2003 | Palmer et al. |
| 2003/0050805 A1* | 3/2003 | Gouyet et al. ................. 705/5 |
| 2003/0058134 A1 | 3/2003 | Sherry |
| 2003/0132860 A1 | 7/2003 | Feyereisen |
| 2003/0225492 A1 | 12/2003 | Cope et al. |
| 2003/0229426 A1 | 12/2003 | Griffin |

| | | | |
|---|---|---|---|
| 2004/0006412 | A1 | 1/2004 | Doose et al. |
| 2004/0059474 | A1 | 3/2004 | Boorman |
| 2004/0111192 | A1 | 6/2004 | Naimer et al. |
| 2004/0183697 | A1 | 9/2004 | Rogers et al. |
| 2004/0230352 | A1 | 11/2004 | Monroe |
| 2004/0254691 | A1 | 12/2004 | Subelet |
| 2005/0182528 | A1 | 8/2005 | Dwyer et al. |
| 2005/0283305 | A1 | 12/2005 | Clark et al. |
| 2006/0004496 | A1 | 1/2006 | Tucker et al. |
| 2008/0316058 | A1 | 12/2008 | Chen et al. |

FOREIGN PATENT DOCUMENTS

| | | |
|---|---|---|
| EP | 0 286 120 | 10/1988 |
| EP | 0 370 640 | 5/1990 |
| EP | 0 489 521 | 6/1992 |
| EP | 1273987 | 1/2003 |
| FR | 2817831 | 6/2002 |
| FR | 2848306 | 6/2004 |
| GB | 886136 | 1/1962 |
| WO | WO 02/24530 | 3/2002 |
| WO | WO-2004/027732 | 4/2004 |

OTHER PUBLICATIONS

U.S. Appl. No. 10/860,760, Sikora et al.
U.S. Appl. No. 10/881,024, Griffin, III et al.
U.S. Appl. No. 10/882,101, Griffin, III et al.
U.S. Appl. No. 10/882,800, Griffin, III et al.
Peugeot 406 Handbook, Automobiles Peugeot, Paris, France, May 14, 1998 (pp. 30 and 38).
Painter et al., "Decision Support for the General Aviation Pilot," Systems, Man, and Cybernetics, IEEE International Conference on Computational Cybernetics and Simulation, Orlando, FL, Oct. 12-15, 1997, pp. 88-93.
U.S. Appl. No. 10/251,493, filed Sep. 20, 2002, Boorman et al.
U.S. Appl. No. 10/746,883, Boorman.
U.S. Appl. No. 10/746,912, Boorman.
U.S. Appl. No. 10/787,644, Tafs et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
Lindenfeld, Ron, "What is an FMS?", Flight Management Systems (5 pages); http://www.ultranet.com/~marzgold//FAQ-FMS.html; [Accessed Jun. 3, 2002].
777 Flight Deck (1 page); http://www.meriweather.com/777/777_main.html; [Accessed Jan. 28, 2003].
Hutchins, Edwin, "The Integrated Mode Management Interface," Department of Cognitive Science, University of California, San Diego, Sep. 17, 1996.
Meriweather's Flight Deck Acronyms & Definitions (4 pages); http://www.meriweather.com/fd/def.html; [Accessed Jun. 3, 2002].
Hooey et al., "Integrating datalink and cockpit display technologies into current and future taxi operations," Digital Avionics Systems Conferences, V2, 8 pages, 2000.

* cited by examiner

METHODS AND SYSTEMS FOR DISPLAYING ASSISTANCE MESSAGES TO AIRCRAFT OPERATORS

TECHNICAL FIELD

The present invention relates generally to methods and systems for displaying assistance messages to aircraft operators, for example, methods and systems for displaying instructions and/or examples of correct inputs upon receiving incorrect inputs at an aircraft flight deck.

BACKGROUND

As modern aircraft have become increasingly complex, aircraft flight controls have made increasing use of computer systems to organize and simplify the pilot's workload. Accordingly, modern aircraft include computer keyboards, cursor control devices, displays and other input/output devices that accept commands and data entered by the pilots and display this information to the pilots.

For example, FIG. 1A illustrates a conventional control display unit (CDU) 30 having input devices 31 (e.g., keyboard keys) and a display screen 35 for displaying data. The display screen 35 can include a preview field 32 that displays information as the pilot enters keystrokes with the input devices 31. For example, in response to a system request to input an airport identifier, the pilot has entered the character string "X34A," which appears in the preview field 32 shown in FIG. 1A.

When the pilot's entry is erroneous (as it is in FIG. 1A, because an airport identifier should not include any numbers), the pilot is notified in a manner shown in FIG. 1B. In particular, the pilot's entry at the preview field 32 is overwritten by the text "INVALID ENTRY." Overwriting the pilot's entry with a short message is necessitated by the fact that space available for pilot displays (and in particular, the space available at the display screen 35 of the CDU 30) is extremely limited. However, this approach suffers from at least two drawbacks. First, once the message "INVALID ENTRY" is displayed, the pilot can no longer see the input that prompted the error message. Accordingly, the pilot cannot review the input to determine what prompted the error message. Second, while the error message makes clear that the pilot made an invalid entry, it does not provide the pilot with any guidance for correcting the error. Accordingly, the pilot's attempts to correct the error may be conducted by trial and error, which can be time consuming.

SUMMARY

The present invention is directed toward methods and systems for handling aircraft operator inputs. A method in accordance with one embodiment of the invention includes receiving an input from an aircraft operator at an aircraft flight deck and comparing a characteristic of the input to at least one target value of the characteristic. If the characteristic of the input differs from the at least one target value for the characteristic by at least a threshold amount, the method can further include displaying an assistance message to the aircraft operator. The assistance message can include at least one of a complying input and an instruction for creating a complying input.

In particular embodiments of the invention, comparing the characteristic of the input can include comparing a format of the input to a target format, comparing a number of characters in a character string to a target number of characters, comparing a type of character in a character string to a target type of character, and/or comparing a numerical value to a target numerical value. The method can further include displaying the same assistance message for all non-complying inputs provided to fulfill data requests of a predetermined type. In further embodiments, the method can further include displaying a first assistance message for non-complying inputs provided to fulfill data requests of a first type and displaying a second assistance message different than the first for non-complying messages provided in response to a data request of a second type different than the first type.

A system for handling aircraft operator inputs in accordance with another embodiment of the invention includes a receiving portion configured to receive an input from an aircraft operator at an aircraft flight deck, and a comparing portion operatively coupled to the receiving portion to compare a characteristic of the input to at least one target value for the characteristic. A display portion can be operatively coupled to the comparing portion to display an assistance message to the aircraft operator if the characteristic of the input differs from the at least one target value by at least a threshold amount. The assistance message can include at least one of a complying input and an instruction for creating a complying input.

DETAILED DESCRIPTION

The following disclosure describes systems and methods for providing assistance to aircraft operators who input information into onboard aircraft computers, for example, flight guidance computers. Certain specific details are set forth in the following description and in FIGS. 2-8 to provide a thorough understanding of various embodiments of the invention. Well-known structures, systems and methods often associated with these aircraft systems have not been shown or described in detail to avoid unnecessarily obscuring the description of the various embodiments of the invention.

Those of ordinary skill in the relevant art will understand that additional embodiments of the present invention may be practiced without several of the details described below.

Many embodiments of the invention described below may take the form of computer-executable instructions, including routines executed by a programmable computer (e.g., a flight guidance computer or a computer linked to a flight guidance computer). Those skilled in the relevant art will appreciate that the invention can be practiced with other computer system configurations as well. The invention can be embodied in a special-purpose computer or data processor that is specifically programmed, configured or constructed to perform one or more of the computer-executable instructions described below. Accordingly, the term "computer" as generally used herein refers to any data processor and includes Internet appliances, hand-held devices (including palm-top computers, wearable computers, cellular or mobile phones, multiprocessor systems, processor-based or programmable consumer electronics, network computers, minicomputers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, as well as distributed electronically over networks. Data structures and transmissions of data particular to aspects of the invention are also encompassed within the scope of the invention.

Figure 1A:
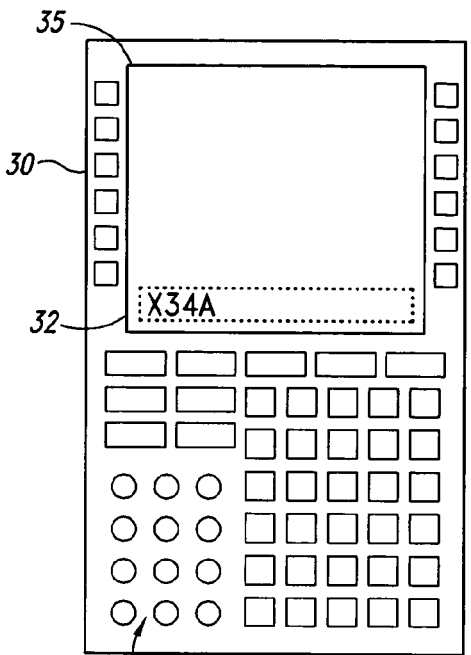
FIGS. 1A-1B illustrate a control display unit configured to display error messages in accordance with the prior art.
Figure 1B:
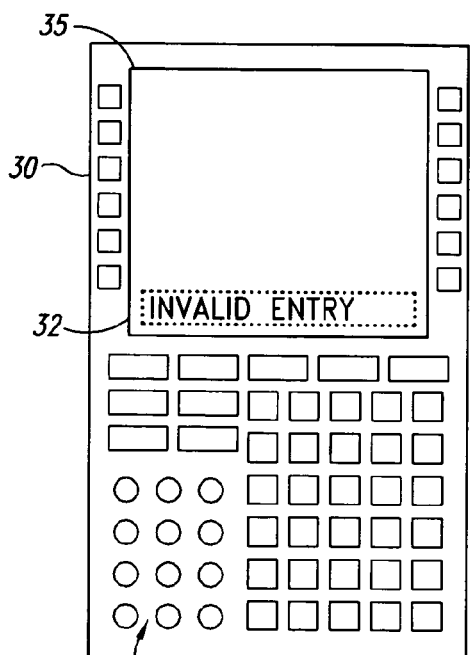
Figure 2:
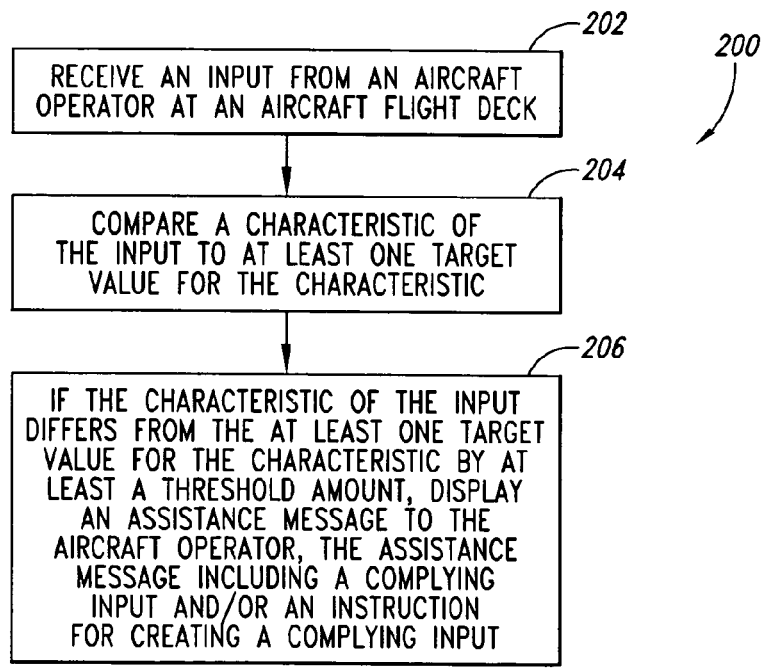
FIG. 2 is a flow diagram illustrating a method for providing assistance messages to an aircraft operator in accordance with an embodiment of the invention.

FIG. 2 is a flow chart illustrating a process 200 for providing assistance to an aircraft operator in accordance with an embodiment of the invention. In process portion 202, the process 200 can include receiving an input from an aircraft operator at an aircraft flight deck. For example, process portion 202 can include receiving information entered by the operator at a keyboard, with the information corresponding to a departure airport, en route way point, aircraft weight, or any of a wide variety of other data associated with aircraft flight operations.

In process portion 204, the process 200 can include comparing a characteristic of the input to at least one target value for the characteristic. For example, process portion 204 can include comparing a number of characters in a character string to the number of characters for an acceptable or complying character string, and/or comparing a numerical value of the input to an acceptable or complying range of numerical values for that type of input. If the characteristic of the input differs from the at least one target value for that characteristic by at least a threshold amount, the process can include displaying an assistance message to the aircraft operator (process portion 206). The assistance message can include a complying input and/or an instruction for creating a complying input. For example, the assistance message can include a list of sample inputs that meet the target value for the characteristic of that input, and/or a textual description of the attributes of a complying input.

The foregoing process may be carried out by routines, subroutines, and/or other computer-based processes. Accordingly, the process of receiving an input from an aircraft operator can be performed by a receiving portion of an aircraft system, comparing a characteristic of the input can be performed by a comparing portion of the system, and displaying an assistance message can be carried out by a displaying portion of the system. In other embodiments, other portions of the system can perform these and/or other functions in combinations other than those described above.

Figure 3:
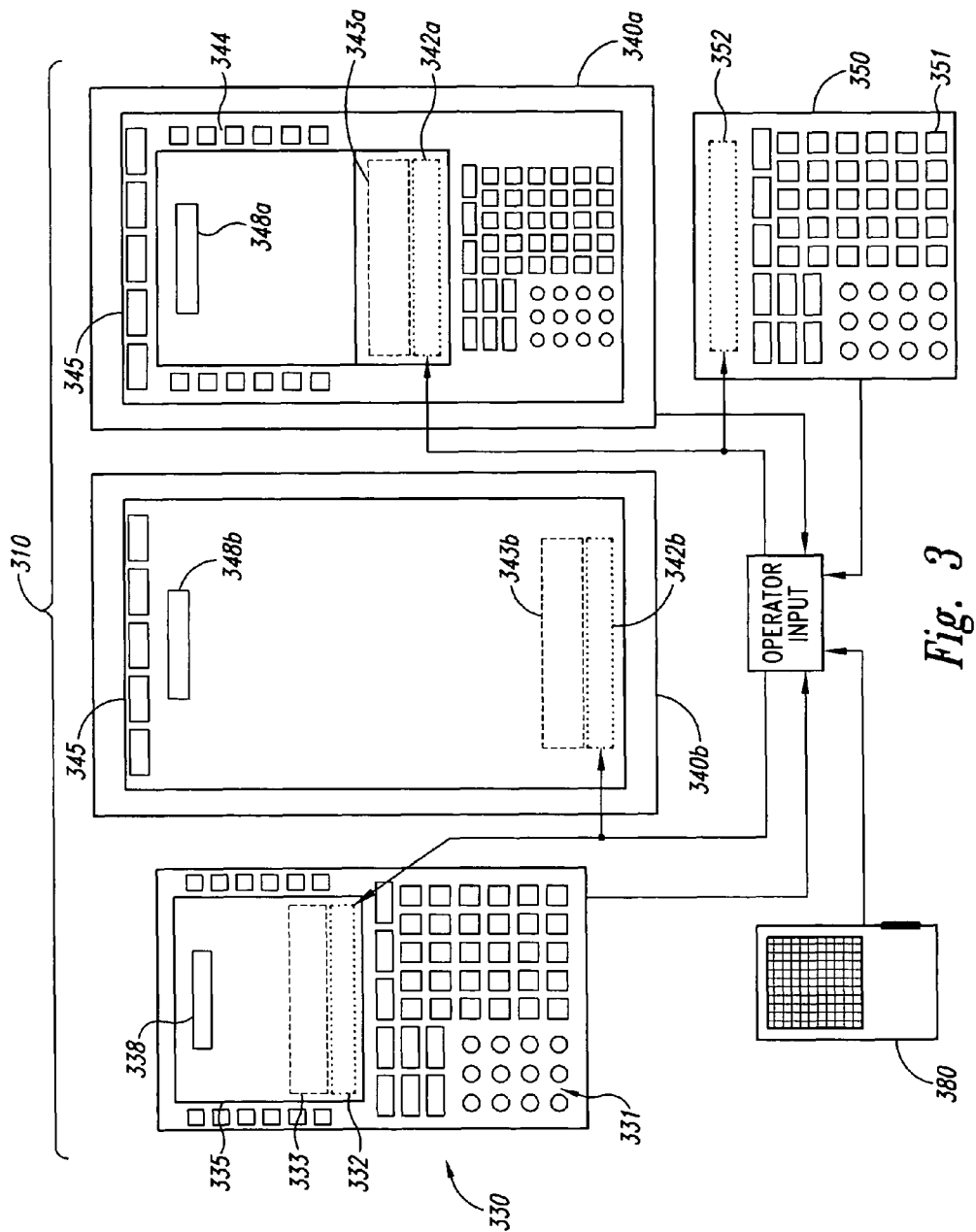
FIG. 3 is a partially schematic illustration of aircraft flight deck components configured to display assistance messages in accordance with an embodiment of the invention.

FIG. 3 illustrates a system 310 having components configured in accordance with one embodiment of the invention to carry out the process 200 described above with reference to FIG. 2. The system 310 can include a plurality of devices for receiving inputs from the operator, displaying the inputs to the operator, and also displaying assistance messages to the operator if the operator's input is incorrect or non-compliant. For example, the system 310 can include a control display unit (CDU) 330 having a display screen 335 and multiple input devices 331 (e.g., alphanumeric input keys). The display screen 335 can include a preview field or scratch pad 332 at which the operator's input is displayed, and an assistance message field 333 which displays assistance messages if the operator's input is incorrect. Accordingly, the display screen 335 can be made larger than conventional CDU display screens, and/or the information presented on the display screen 335 can be compressed, and/or some information conventionally presented at the CDU 330 can be eliminated. In any of these embodiments, once the system 310 processes the input and determines that input is compliant, the input can be entered and displayed at an active input field 338. The input can then be activated automatically or after the operator provides an additional input requesting activation. The activated input can become part of a flight plan and/or can direct a change in a characteristic of the aircraft (e.g., the aircraft speed, direction and/or altitude).

The functions provided by the input devices 331, the preview field 332 and the assistance message field 333 can be distributed over other devices of the system 310, in addition to or in lieu of the CDU 330. For example, the system 310 can include a plurality of multifunction displays (MFDs) 340, shown as a first multifunction display 340a and a second multifunction display 340b. Each multifunction display 340 can include a screen 345 large enough to accommodate a preview field 342 (shown as first and second preview fields 342a, 342b), an assistance message field 343 (shown as first and second assistance message fields 343a, 343b) and an active input field 348 (shown as first and second active input fields 348a, 348b).

The first MFD 340a can be configured to emulate the display presented by the CDU 330, and can accordingly further include an emulated CDU display 344. The emulated CDU display 344 is larger than a conventional CDU display so as to accommodate the first assistance message field 343a. Further details of MFDs, including MFDs configured to emulate CDU displays are provided in co-pending U.S. application Ser. No. 10/814,369, entitled "Systems and Methods for Handling the Display and Receipt of Aircraft Control Information," and U.S. application Ser. No. 10/815,034, entitled "Methods and Systems for Controlling the Display of Information at an Aircraft Flight Deck," both filed concurrently herewith and both incorporated herein in their entireties by reference.

The input data appearing in the first preview field 342a can be provided by the input devices 331 of the CDU 330 or by other devices. For example, the system 310 can include a detached keyboard 350 having input devices (e.g., alphanumeric input keys) 351 that allow the operator to input data. The input data can appear in a preview field 352 of the detached keyboard 350, and can simultaneously appear at any of the other preview fields shown in FIG. 3. In another embodiment, the operator can use a cursor control device 380 or another device to input data and/or transfer data from a preview field of one device to preview field of another device. In any of these embodiments, the operator can submit the input data for processing and entry, also by activating the cursor control device 380 or another input device (e.g., the input devices 331, 351).

In any of the arrangements described above with reference to FIG. 3, the operator can input data at a preview field and, if the data are incorrect, the operator can receive an assistance message while the data in the preview field are still visible. In a particular aspect of these embodiments, the assistance message can appear at a position at least proximate to the preview field so that the operator can simultaneously view both the erroneous input and the assistance message without having to move his or her eyes over a wide spatial range. Further details of the operation of the system 310 are described below with reference to FIG. 4-8.

Figure 4:
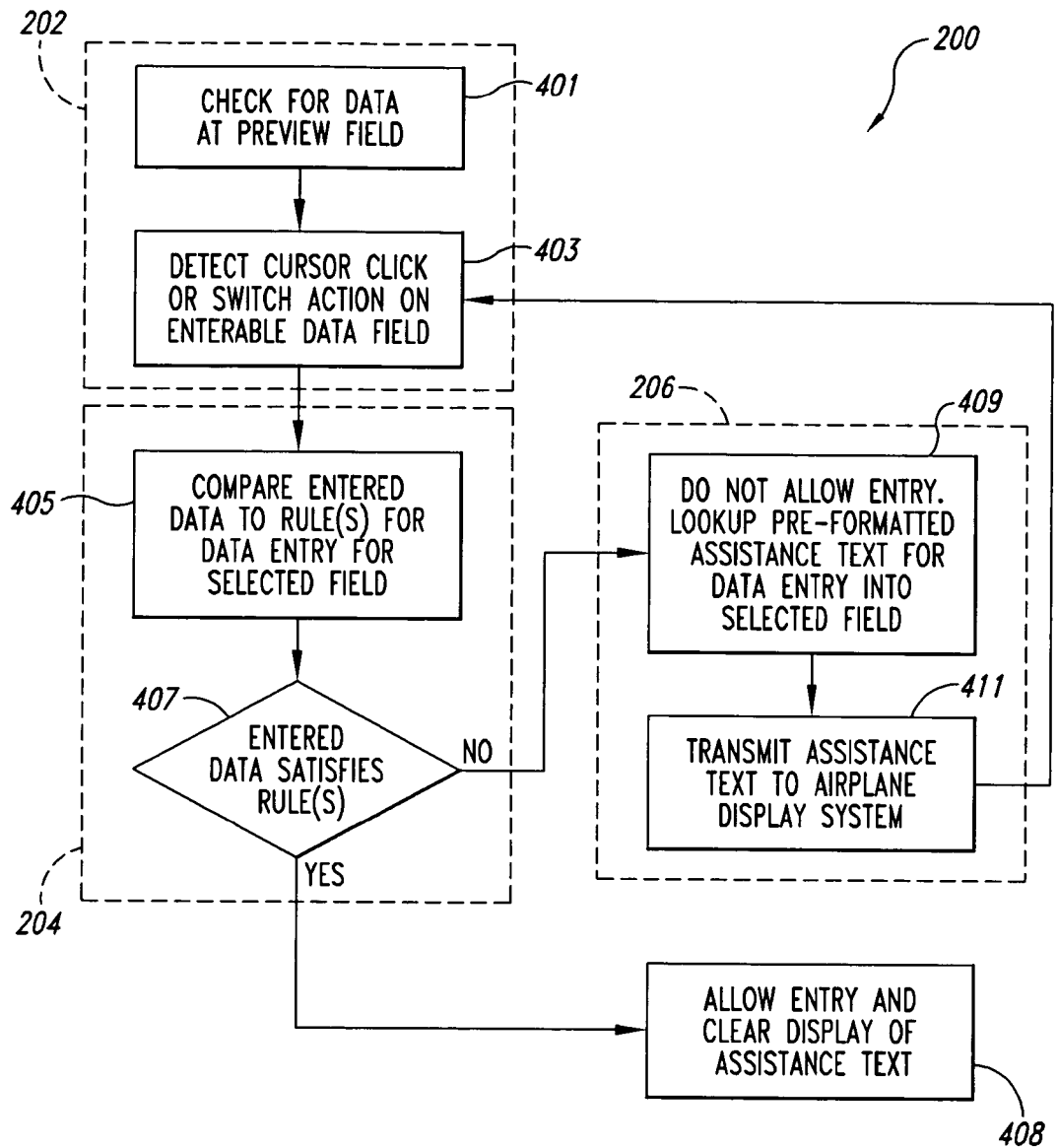
FIG. 4 is a flow diagram illustrating a method for displaying assistance messages in accordance with another embodiment of the invention.

FIG. 4 illustrates further details of an embodiment of the process 200 described above with reference to FIG. 2. Receiving an input from an aircraft operator (process portion 202) can include checking for data at a scratch pad or other preview field (process portion 401) and detecting a signal (e.g., cursor click or other switch action) indicating that the operator wishes to submit or enter the data appearing at the preview field (process portion 403). In process portion 405, the entered data are compared to rules, guidelines or target values for data that are received at a particular field (e.g., a particular preview field) and are to be directed to a particular field, for example, a particular active input field. In process portion 407, the process 200 includes determining whether or not the entered data satisfy the rule(s). If they do, the data can be entered, for example, by moving the data to an active input field (process portion 408). The assistance message, if there is one, can be cleared or removed. If the data do not satisfy the rule(s), then in process portion 409, the data are not loaded to an active input field and instead an appropriate assistance message is obtained, for example, from a lookup table. The assistance message is then transmitted to any of the assistance message fields described above with reference to FIG. 3 (process portion 411). Once the assistance message has been transmitted, the process 200 returns to process portion 403 to await an updated data entry by the operator. This process continues to cycle until a complying entry is received.

Figure 5:
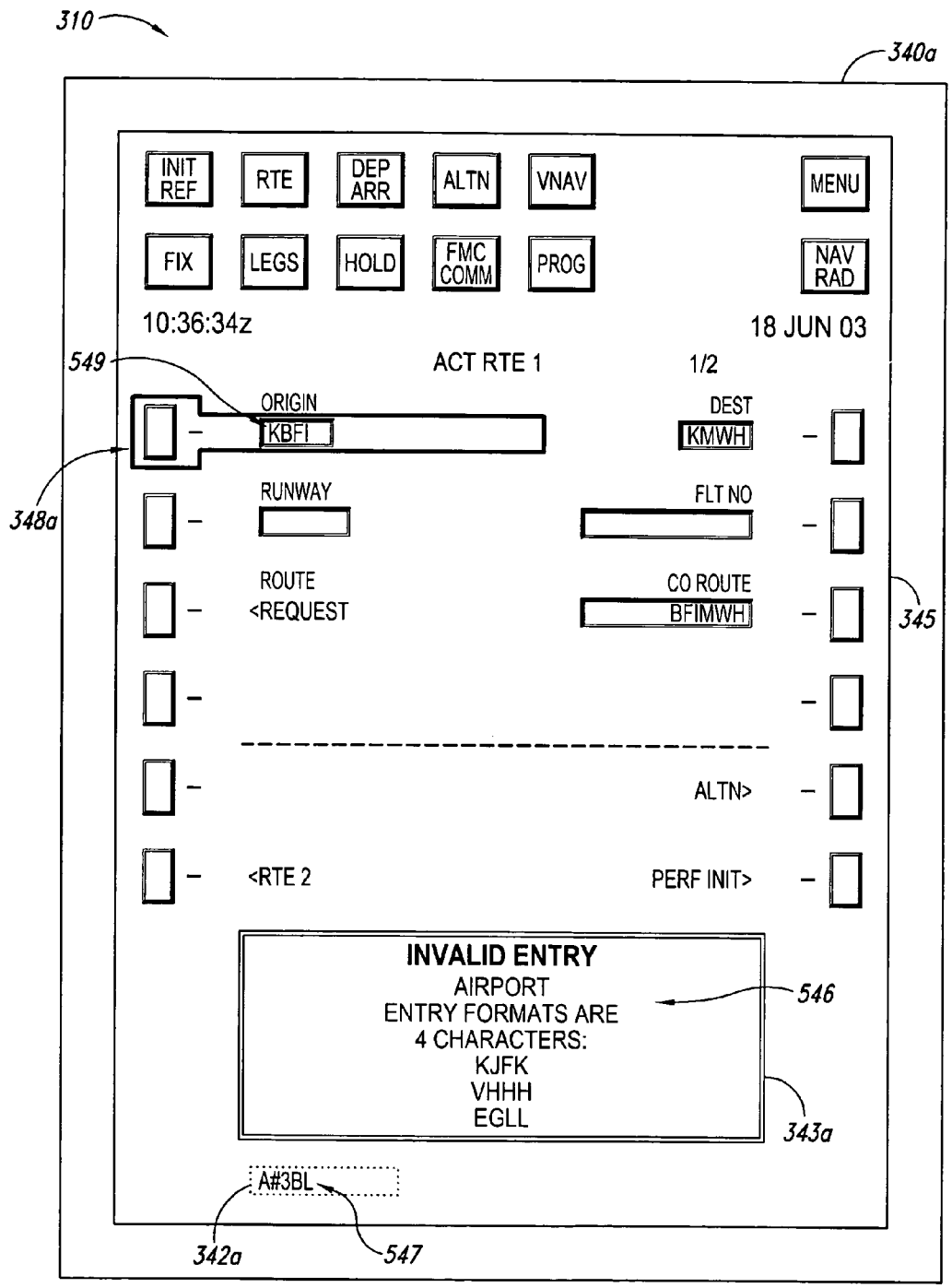
FIG. 5 is an illustration of a multifunction display panel or screen presenting an assistance message corresponding to an invalid entry for an airport identifier in accordance with an embodiment of the invention.
Figure 6:
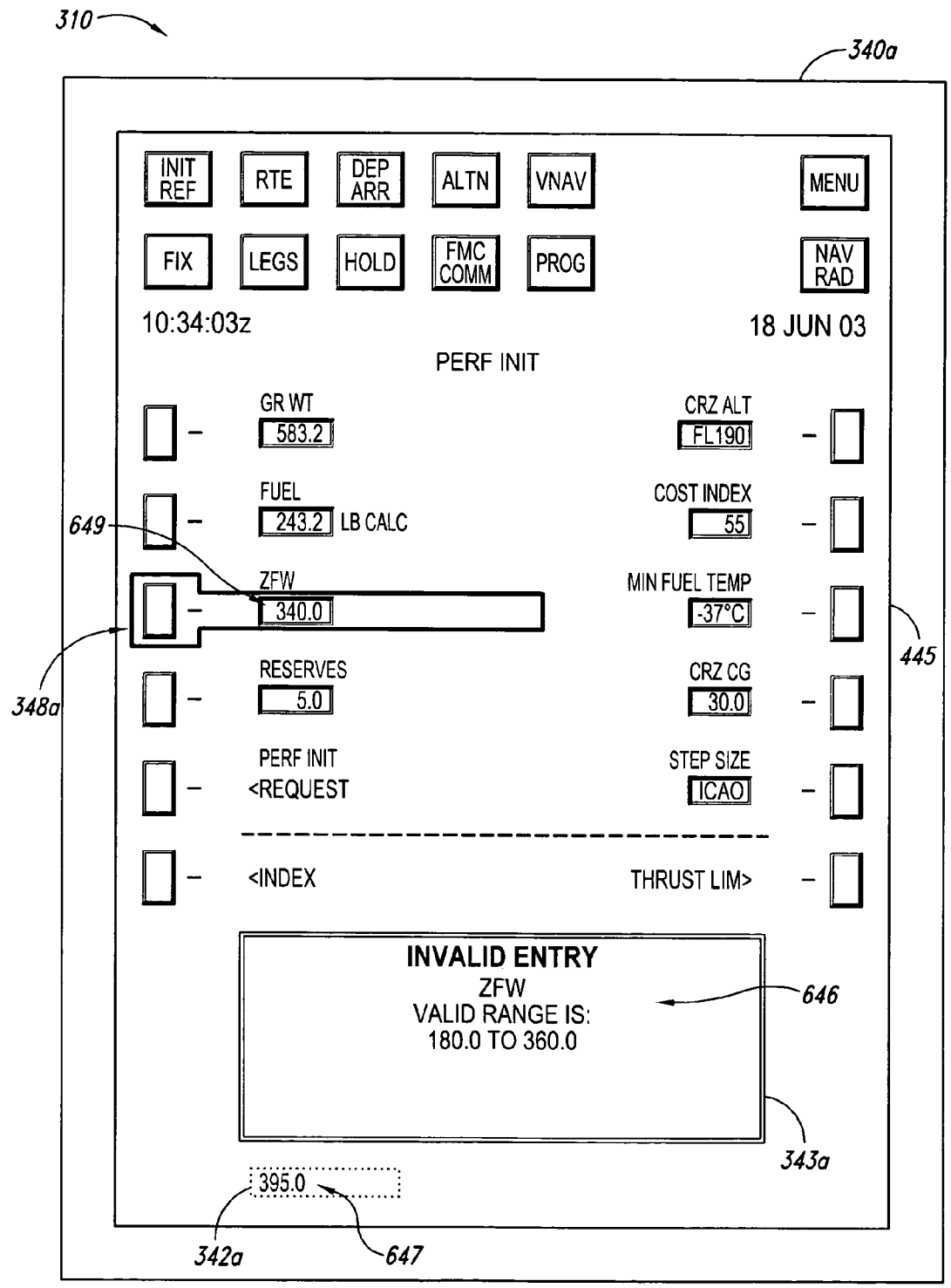
FIG. 6 is an illustration of a multifunction display panel or screen presenting an assistance message corresponding to an invalid airplane weight in accordance with an embodiment of the invention.
Figure 7:
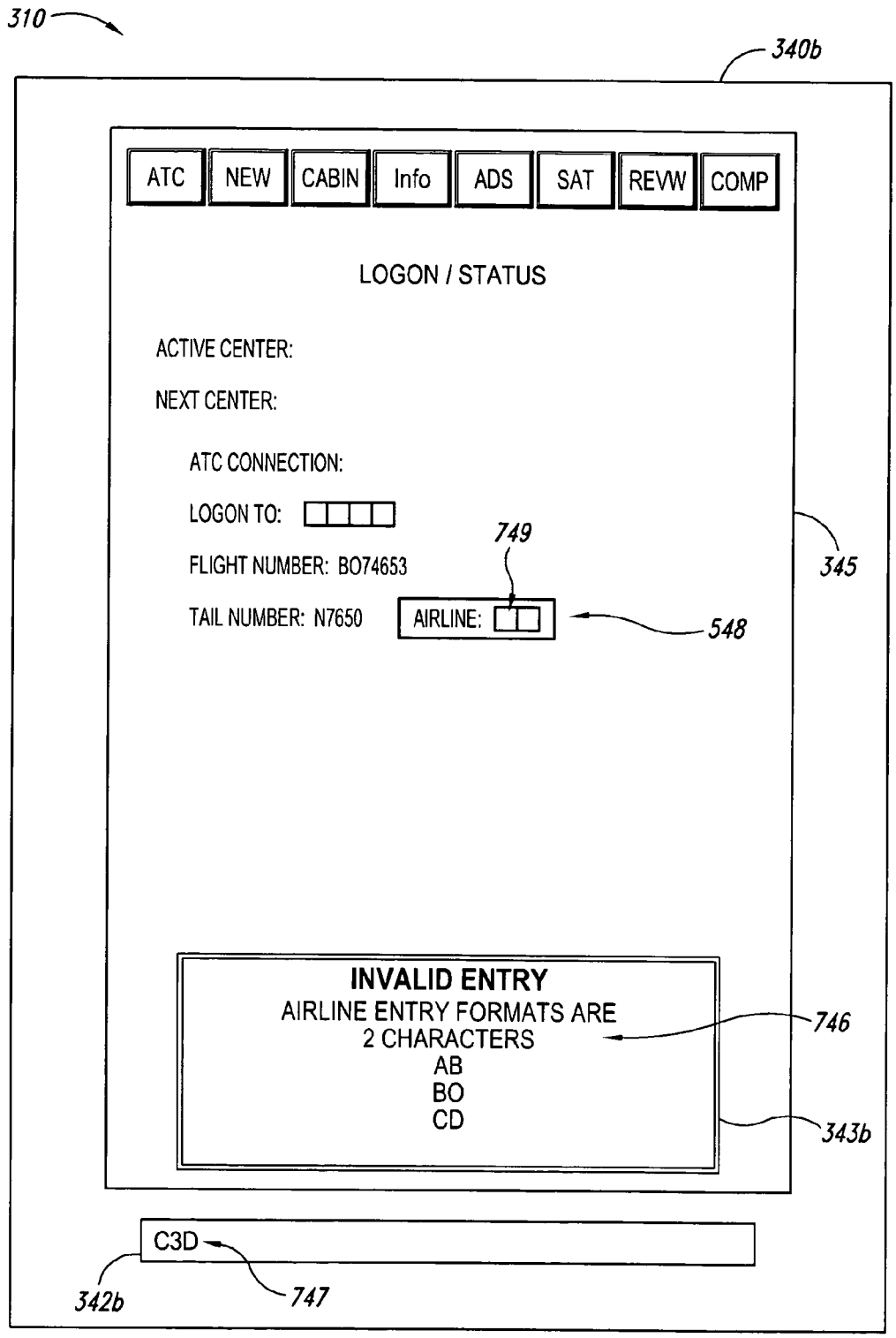
FIG. 7 is an illustration of a multifunction display panel or screen presenting an assistance message corresponding to an invalid airline entry in accordance with still another embodiment of the invention.

FIGS. 5-7 illustrate examples of preview fields displaying incorrect entries, corresponding assistance message fields displaying corresponding assistance messages, and active input fields displaying complying messages, in accordance with several embodiments of the invention. Beginning with FIG. 5, the screen 345 or other display of the first MFD 340*a* presents a currently active input 549 corresponding to an origin airport from which the aircraft is to depart ("KBFI"). The operator has attempted to update the information in the active input field 348*a* by entering a preview input 547 containing the characters "A#3BL," which appear in the preview field 342*a*. The operator has then entered another input signal (e.g., by a click on the cursor control device 380 shown in FIG. 3) to submit the preview input 547 for processing and replace the active input 549 with the preview input 547. Because the preview input 547 contains errors, the system 310 does not replace the active input 549 and instead displays an assistance message 546 at the assistance message field 343*a*.

The assistance message 546 shown in FIG. 5 indicates that the preview input 547 is non-compliant, includes samples of compliant entries, and provides a textual message indicating why the attempted entry is non-compliant. The operator can review the assistance message 546 and understand that not only is the attempted entry non-compliant but that to create a compliant entry, the operator must enter a character string having four characters. By viewing the examples, the operators can understand that the characters should be alphabetic (rather than symbolic or numeric) characters. Accordingly, the operator can re-enter the preview input 547 and, if necessary, continue to re-input the entry until a complying entry is provided.

In one aspect of an embodiment described above with reference to FIG. 5, the same assistance message 546 can be displayed at the assistance message field 343*a* regardless of the content of erroneous message received at the preview field 342*a*. In another embodiment, the assistance message 546 can be tailored to the particular error identified by the system 310. For example, if the preview input 547 contains too many characters, but all the characters are alphabetic characters, the assistance message 546 can be generally similar to the one shown in FIG. 5. If the preview input 547 includes non-alphabetic characters, the assistance message 546 can include text indicating that only alphabetic characters are complying. In other examples, if the preview input 547 fails to comply with multiple criteria associated with a complying input, the assistance message 546 can include information corresponding to the multiple criteria. If the preview input 547 fails to comply with only a single criterion associated with a complying message, then the assistance message 546 can include information corresponding to only the single criterion.

FIG. 6 illustrates the first MFD 340*a* presenting an active input 649 corresponding to an aircraft weight (less fuel) of "340.0." The operator has attempted to update the active input 649 with a preview input 647 having a value of "395.0." This value is out of range for this particular aircraft and accordingly, the system 310 displays an assistance message 646 indicating that the entry is invalid and indicating the range of values the operator can enter to provide a valid input (e.g., a value of from "180.0" to "360.0").

FIG. 7 illustrates the second MFD 340*b* presenting a blank active input 749 corresponding to the airline code of the subject aircraft. The operator has attempted to provide a preview input 747 corresponding an airline code of "C3D" appearing at the preview display field 342*b*. This entry does not comply with the standards for a valid entry, and accordingly an assistance message 746 is displayed at the assistance message field 343*b*. The assistance message 746 indicates that the entry is non-compliant and that a compliant airline code includes two characters. The assistance message 746 also includes a display of sample compliant messages.

One feature of the embodiments of the systems and methods described above with reference to FIGS. 2-7 is that the assistance messages provided to the aircraft operator when the operator attempts to input an invalid entry go beyond simply indicating that the entry is invalid or non-compliant. Instead, the assistance messages can indicate why the entry is non-compliant, provide instructions for creating a complaint entry, and/or provide examples of compliant entries. Accordingly, the operator can more quickly, efficiently, and accurately correct an invalid entry, freeing up time to attend to other aircraft management tasks.

Another feature of embodiments of systems and methods described above with reference to FIGS. 2-7 is that the display of an erroneous entry is not overwritten by a message indicating that the entry is erroneous. Instead, the assistance message appears simultaneously with the erroneous entry. An advantage of this feature is that the operator can view the erroneous entry along with the assistance message to better understand why the entry is non-compliant and can accordingly generate a compliant entry more easily.

Still a further feature of embodiments of systems and methods described above with reference to FIGS. 2-7 is that the assistance message can be displayed not only simultaneously with the non-compliant entry, but also proximate to the non-compliant entry. Accordingly, the operator need not shift his or her eyes a significant distance back and forth between the non-compliant entry and the assistance message to understand why the entry is non-compliant and/or to correct the entry. An advantage of this feature is that it can ease the operator's workload by making the task of entering correct data simpler, less time consuming and less fatiguing than existing methods.

Yet a further feature of embodiments of the systems and methods described above with reference to FIGS. 2-7 is that the assistance messages displayed by the system can be tailored to the type of input message received by the system and/or provided to fulfill data requests of a particular type. For example, the assistance message displayed when the system receives an erroneous airport identifier can be different than the assistance message received when the system receives an erroneous value for aircraft weight. In some embodiments, the assistance message displayed in response to a first type of erroneous input can be different than the assistance message displayed in response to a second, different type of erroneous message received to fulfill the same type of data request. For example, the assistance message displayed when an input airline code has the incorrect number of characters can be different than the message displayed when the characters themselves are of the wrong type. In any of these embodiments, the assistance message can provide the operator with assistance that is more precisely tailored to correct the operator's input error than are existing messages.

In other embodiments, the inputs can have other characteristics. For example, the inputs can include a character string having an element of data and a modifier corresponding to the data element. One example of such a character string is a runway designation of "25R" (for runway 25 right). If the order in which the operator inputs the data and the modifier is incorrect (e.g., if the operator inputs "R25"), then the assistance message can include an indication that the modifier should be placed after, rather than before the data.

In still further embodiments, the type of assistance message displayed to the operator can be controlled and/or configured by the end user (e.g., by an airline). For example, the airline may select from a variety of assistance messages, which may vary in the level of detail they provide to the operator, and the airline may select which type of message they wish to have displayed to the operator. In other embodiments, the airline can tailor the language of the message, for example, to include non-English terms and/or to be more intuitive to non-English native speakers. In any of these embodiments, the system can provide a menu of responses from which the airline can select a preferred response, and/or the system can provide the airline with the ability to edit any response. An advantage of this arrangement is that the airline can tailor the type of message displayed to the operator, based on average operator experience and/or other factors.

Figure 8:
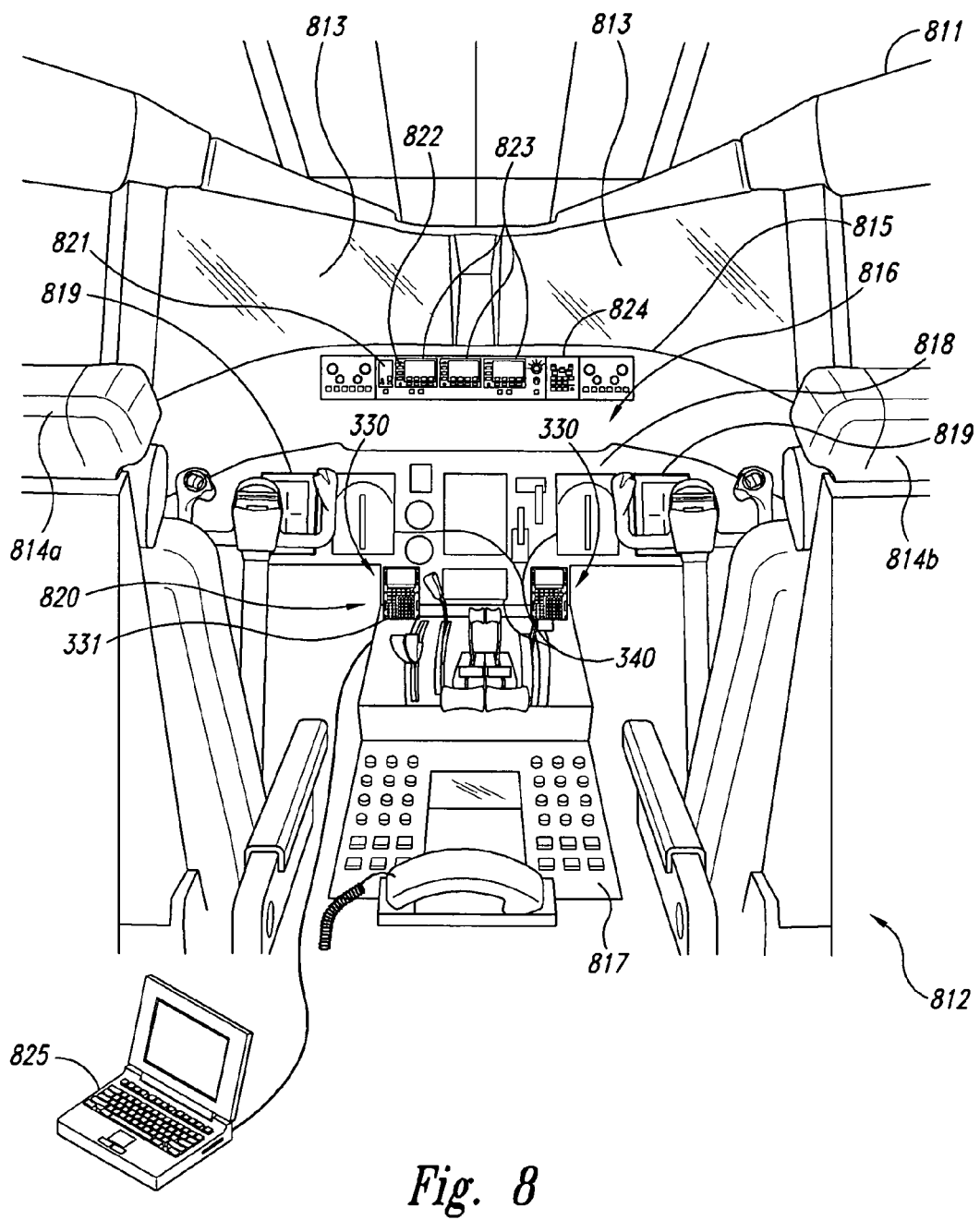
FIG. 8 illustrates a flight deck having input devices and display panels or screens on which assistance messages can be displayed in accordance with still further embodiments of the invention.

FIG. 8 is a partially schematic, forward looking view of the flight deck 812 of an aircraft 811, which provides an environment in which the inputs described above are received, processed and displayed in accordance with an embodiment of the invention. The flight deck 812 can include forward windows 813 providing a forward field of view out of the aircraft 811 for operators seated in a first seat 814a and/or a second seat 814b. In other embodiments, the forward windows 813 can be replaced with one or more external vision screens that include a visual display of the forward field of view out of the aircraft 811. A glare shield 815 can be positioned adjacent to the forward windows 813 to reduce the glare on one or more flight instruments 816 positioned on a control pedestal 817 and a forward instrument panel 818.

The flight instruments 816 can include primary flight displays (PFDs) 819 that provide the operators with actual flight parameter information. The flight deck 812 can also include the MFDs 340 (described above with reference to FIG. 3) for displaying navigation information, assistance messages, flight plan lists and other data. The assistance messages can also be displayed at one or more of the CDUs 330 positioned on the control pedestal 812. The CDUs 330, which can also include the input devices 331 described above with reference to FIG. 3, can provide a front end for a flight management computer 820. A mode control panel 821 positioned on the glare shield 815 can include input devices 822 for receiving inputs from the operators, and a plurality of displays 823 for providing flight control information to the operators. The information can also be displayed, entered and/or stored on a laptop computer 825 coupled to the flight instruments 816.

The operators can select the type of information displayed on at least some of the displays (e.g., the MFDs 340) by manipulating a display select panel 824. Accordingly, the operator can select which of the MFDs 340 presents the preview displays, assistance messages, and active inputs described above with reference to FIGS. 2-7. In any of these embodiments, the assistance messages can be displayed in a manner generally similar to the methods described above, and can accordingly provide an efficient, intuitive, and instructive system for receiving and correcting operator inputs.

From the foregoing, it will be appreciated that specific embodiments of the invention have been described herein for purposes of illustration, but that various modifications may be made without deviating from the spirit and scope of the invention. For example, aspects of the invention described in the context of particular embodiments can be combined and/or eliminated in other embodiments. Accordingly, the invention is not limited except as by the appended claims.

We claim:

1. A method for handling aircraft operator inputs, comprising:
    receiving an input from an aircraft operator at an aircraft flight deck;
    comparing a characteristic of the input to at least one target value for the characteristic;
    if the characteristic of the input differs from the at least one target value for the characteristic by at least a threshold amount, displaying an assistance message to the aircraft operator, the assistance message including at least one of a complying input and an instruction for creating a complying input, wherein displaying the assistance message comprises:
        determining whether the input fails to comply with the target value on a first basis or a second basis different from the first basis;
        providing a first assistance message if the input fails to comply with the target value for the characteristic on the first basis; and
        providing a second assistance message different than the first assistance message if the input fails to comply with the target value for the characteristic on the second basis.

2. The method of claim 1 wherein displaying an assistance message includes displaying an assistance message at least proximate to and simultaneously with displaying the input.

3. The method of claim 1 wherein receiving an input includes receiving an input that includes alphanumeric characters.

4. The method of claim 1, further comprising activating the input if the characteristic of the input does not differ from the at least one target value, or differs from the at least one target value by less than the threshold amount.

5. The method of claim 1, further comprising presenting the input at an active display field if the characteristic of the input does not differ from the at least one target value, or if the characteristic of the input differs from the at least one target value by less than the threshold amount.

6. The method of claim 1, further comprising activating the input if the characteristic of the input does not differ from the at least one target value, or if the characteristic of the input differs from the at least one target value by less than the threshold amount, and wherein activating the input includes directing a change in a characteristic of the aircraft.

7. The method of claim 1, further comprising activating the input if the characteristic of the input does not differ from the at least one target value, or if the characteristic of the input differs from the at least one target value by less than the threshold amount, and wherein activating the input includes directing a change in at least one of a speed, altitude and flight path of the aircraft.

8. The method of claim 1 wherein comparing a characteristic includes comparing a format of the input to a target format.

9. The method of claim 1 wherein comparing a characteristic includes comparing a number of characters in a character string to a target number of characters.

10. The method of claim 1 wherein comparing a characteristic includes comparing a type of character in a character string to a target type of character.

11. The method of claim 1 wherein comparing a characteristic includes comparing a numerical value to a target numerical value.

12. The method of claim 1 wherein displaying a message includes displaying a plurality of sample complying inputs.

13. The method of claim 1, further comprising displaying the same assistance message for all non-complying inputs provided to fulfill data requests of a predetermined type.

14. The method of claim 1 wherein displaying an assistance message includes displaying multiple criteria associated with a complying input.

15. The method of claim 1 wherein displaying an assistance message includes displaying an indication of a single criterion associated with a complying input when the input received at the aircraft flight deck fails to comply with the single criterion.

16. The method of claim 1 wherein displaying the assistance message includes displaying at least one of a number of characters for a complying input, at least one alphabetic character for a complying input, and at least one numerical character for a complying input.

17. The method of claim 1 wherein a complying input includes a data element and a modifier, and wherein displaying the assistance message includes indicating the position of the modifier relative to the data element for a complying input.

18. The method of claim 1, further comprising:
receiving a request for a change in a characteristic of the assistance message; and
changing the characteristic of the assistance message.

19. The method of claim 1, further comprising:
displaying the input at a first location of the aircraft flight deck; and
displaying the assistance message at a second location of the aircraft flight deck, the second location being at least proximate to the first location.

20. The method of claim 1 wherein the input includes a first input, and wherein the method further comprises:
receiving a second input, the second input being a complying input; and
ceasing to display the assistance message after receiving the second input.

21. The method of claim 1 wherein displaying the assistance message includes displaying the assistance message at a multi-function display of the aircraft flight deck.

22. A method for handling aircraft operator inputs, comprising:
receiving an input from an aircraft operator at an aircraft flight deck, the input corresponding to a string of alphanumeric characters;
displaying the input;
comparing a characteristic of the input to at least one target value for the characteristic;
if the characteristic of the input differs from the at least one target value for the characteristic by at least a threshold amount, displaying an assistance message to the aircraft operator simultaneously with displaying the input and at least proximate to the input, the assistance message including at least one of a complying input and an instruction for creating a complying input, wherein displaying the assistance message comprises:
determining whether the input differs from the target value on a first basis or a second basis different from the first basis;
providing a first assistance message if the input differs from the target value on the first basis; and
providing a second assistance message different than the first assistance message if the input differs from the target value on the second basis; and
if the characteristic of the input does not differ from the at least one target value, or differs from the at least one target value by less than the threshold amount, activating the input.

23. The method of claim 22 wherein activating the input includes presenting the input at an active display field.

24. The method of claim 22 wherein comparing a characteristic includes comparing a format of the input to a target format.

25. The method of claim 22 wherein comparing a characteristic includes comparing a number of characters in a character string to a target number of characters.

26. The method of claim 22 wherein comparing a characteristic includes comparing a type of character in a character string to a target type of character.

27. The method of claim 22 wherein comparing a characteristic includes comparing a numerical value to a target numerical value.

28. The method of claim 22 wherein displaying a message includes displaying a plurality of sample complying inputs.

29. The method of claim 22 wherein the input includes a first input, and wherein the method further comprises:
receiving a second input, the second input being a complying input; and
ceasing to display the assistance message after receiving the second input.

30. The method of claim 22 wherein displaying the assistance message includes displaying the assistance message at a multi-function display of the aircraft flight deck.

31. A system for handling aircraft operator inputs, comprising:
a receiving portion configured to receive an input from an aircraft operator at an aircraft flight deck;

a comparing portion operatively coupled to the receiving portion to compare a characteristic of the input to at least one target value for the characteristic; and a display portion operatively coupled to the comparing portion to direct a display of an assistance message to the aircraft operator if the characteristic of the input differs from the at least one target value for the characteristic by at least a threshold amount, the assistance message including at least one of a complying input and an instruction for creating a complying input, wherein directing the display of the assistance message comprises:

determining whether the input differs from the at least one target value on a first basis or a second basis different from the first basis;

providing a first assistance message if the input differs from the at least one target value on the first basis; and providing a second assistance message different than the first assistance message if the input differs from the at least one target value on the second basis.

32. The system of claim 31 wherein the receiving portion, the comparing portion and the display portion include computer-readable media.

33. The system of claim 31, further comprising a display device operatively coupled to the display portion to display the input and the assistance message.

34. The system of claim 31, further comprising a multi-function display device operatively coupled to the display portion to display the input and the assistance message.

35. The system of claim 31, further comprising an aircraft, the aircraft housing the receiving portion, the comparing portion and the display portion.

36. A computer-readable medium for handling aircraft operator inputs by performing a method, comprising:

receiving an input from an aircraft operator at an aircraft flight deck;

comparing a characteristic of the input to at least one target value for the characteristic;

if the characteristic of the input differs from the at least one target value for the characteristic by at least a threshold amount, displaying an assistance message to the aircraft operator, the assistance message including at least one of a complying input and an instruction for creating a complying input, wherein displaying the assistance message comprises:

determining whether the input differs from the at least one target value on a first basis or a second basis different from the first basis;

providing a first assistance message if the input differs from the at least one target value on the first basis; and providing a second assistance message different than the first assistance message if the input differs from the at least one target value on the second basis.

37. The computer-readable medium of claim 36 wherein displaying an assistance message includes displaying an assistance message at least proximate to and simultaneously with displaying the input.

38. The computer-readable medium of claim 36 wherein the method further comprises activating the input if the characteristic of the input does not differ from the at least one target value, or differs from the at least one target value by less than the threshold amount.

39. The computer-readable medium of claim 36 wherein the method further comprises activating the input if the characteristic of the input does not differ from the at least one target value, or if the characteristic of the input differs from the at least one target value by less than the threshold amount, and wherein activating the input includes presenting the input at an active display field.

40. The computer-readable medium of claim 36 wherein comparing a characteristic includes comparing a format of the input to a target format.

41. The computer-readable medium of claim 36 wherein comparing a characteristic includes comparing a number of characters in a character string to a target number of characters.

42. The computer-readable medium of claim 36 wherein comparing a characteristic includes comparing a type of character in a character string to a target type of character.

43. The computer-readable medium of claim 36 wherein comparing a characteristic includes comparing a numerical value to a target numerical value.

44. The computer-readable medium of claim 36 wherein the method further comprises displaying the same assistance message for all non-complying inputs provided to fulfill data requests of a predetermined type.

45. A system for handling aircraft operator inputs, comprising:

receiving means for receiving an input from an aircraft operator at an aircraft flight deck;

comparing means for comparing a characteristic of the input to at least one target value for the characteristic; and display means for directing a display of an assistance message to the aircraft operator if the characteristic of the input differs from the at least one target value for the characteristic by at least a threshold amount, the assistance message including at least one of a complying input and an instruction for creating a complying input, wherein directing the display of the assistance message comprises:

determining whether the input differs from the at least one target value on a first basis or a second basis different from the first basis;

providing a first assistance message if the input differs from the at least one target value on the first basis; and providing a second assistance message different than the first assistance message if the input differs from the at least one target value on the second basis.

46. The system of claim 45 wherein the receiving means, the comparing means and the display means include computer-readable media.

47. The system of claim 45, wherein the display means includes a display device for displaying the input and the assistance message.

48. The system of claim 45, further comprising an aircraft housing the receiving means, the comparing means and the display means.

* * * * *